United States Patent [19]

Flannigan et al.

[11] 4,377,848
[45] Mar. 22, 1983

[54] ALTITUDE CAPTURE MODE FOR AIRCRAFT AUTOMATIC FLIGHT CONTROL SYSTEM

[75] Inventors: James B. Flannigan, Scottsdale; Jack E. Emfinger; Thomas R. Elliott, both of Phoenix, all of Ariz.

[73] Assignee: Sperry Corporation, New York, N.Y.

[21] Appl. No.: 197,735

[22] Filed: Oct. 16, 1980

[51] Int. Cl.³ .................... G06F 15/50; G06G 7/78
[52] U.S. Cl. .................................. 364/433; 244/180; 364/434
[58] Field of Search .................... 364/433, 434, 444; 244/180, 181

[56] References Cited

U.S. PATENT DOCUMENTS

| | | | |
|---|---|---|---|
| 3,545,703 | 12/1970 | Montvale et al. | 244/180 |
| 3,638,092 | 1/1972 | Kammerer | 244/180 X |
| 3,899,661 | 8/1975 | Lehfeldt | 364/433 |
| 4,094,480 | 6/1978 | Nixon | 244/180 |
| 4,114,842 | 9/1978 | Hofferber et al. | 364/434 X |

Primary Examiner—Jerry Smith
Attorney, Agent, or Firm—Howard P. Terry

[57] ABSTRACT

An automatic pilot apparatus, for controlling an aircraft during the execution of a maneuver to capture a predetermined altitude, utilizes an altitude control law formula and signal which define a circular flight path intercepting the predetermined altitude and which result in a normal acceleration force on the aircraft. A signal representative of the normal acceleration force is utilized to generate a predictive pitch command signal which is combined with the control law signal to generate a pitch attitude command signal, thereby allowing the aircraft to smoothly capture the predetermined altitude.

10 Claims, 5 Drawing Figures

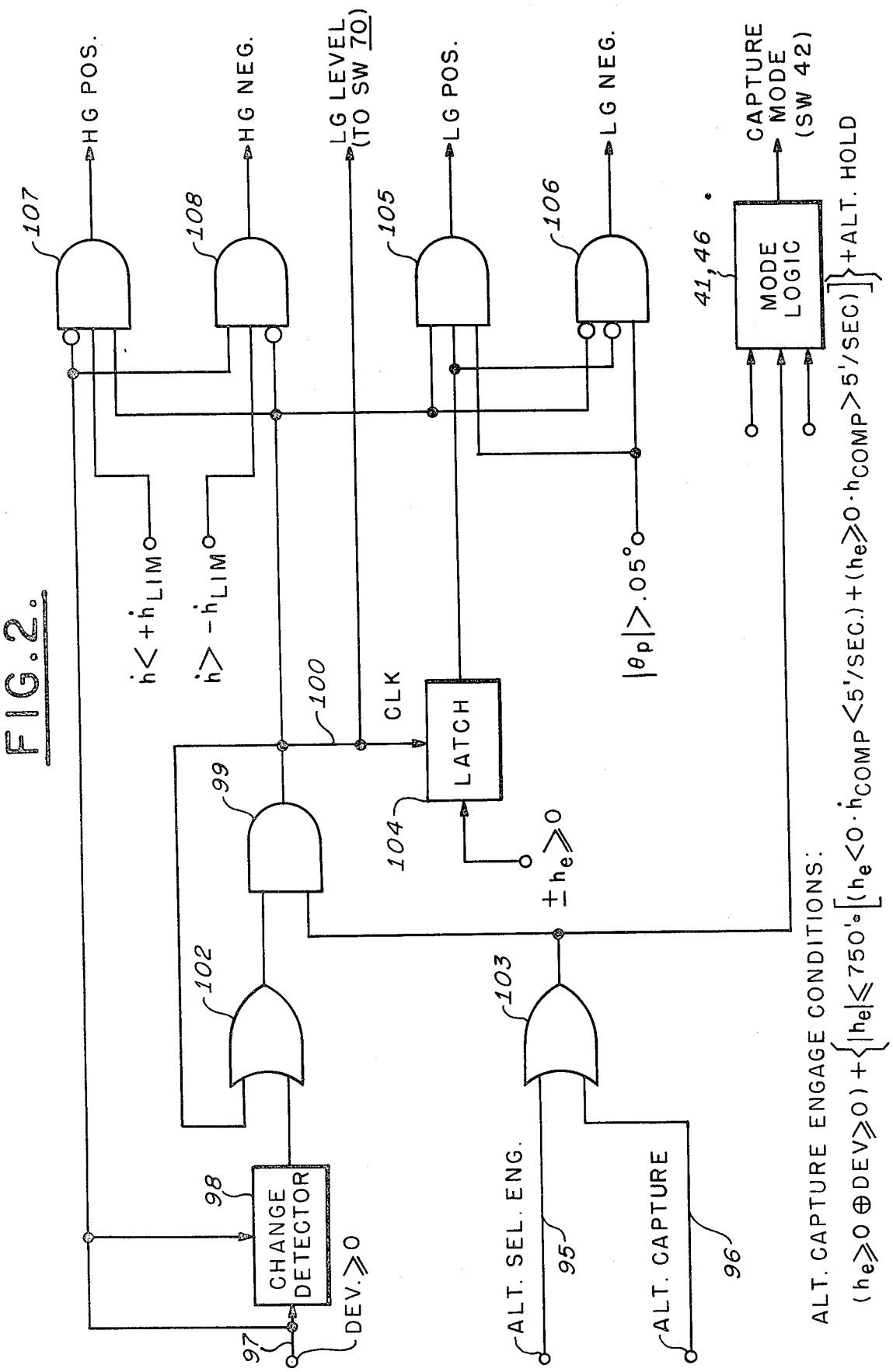

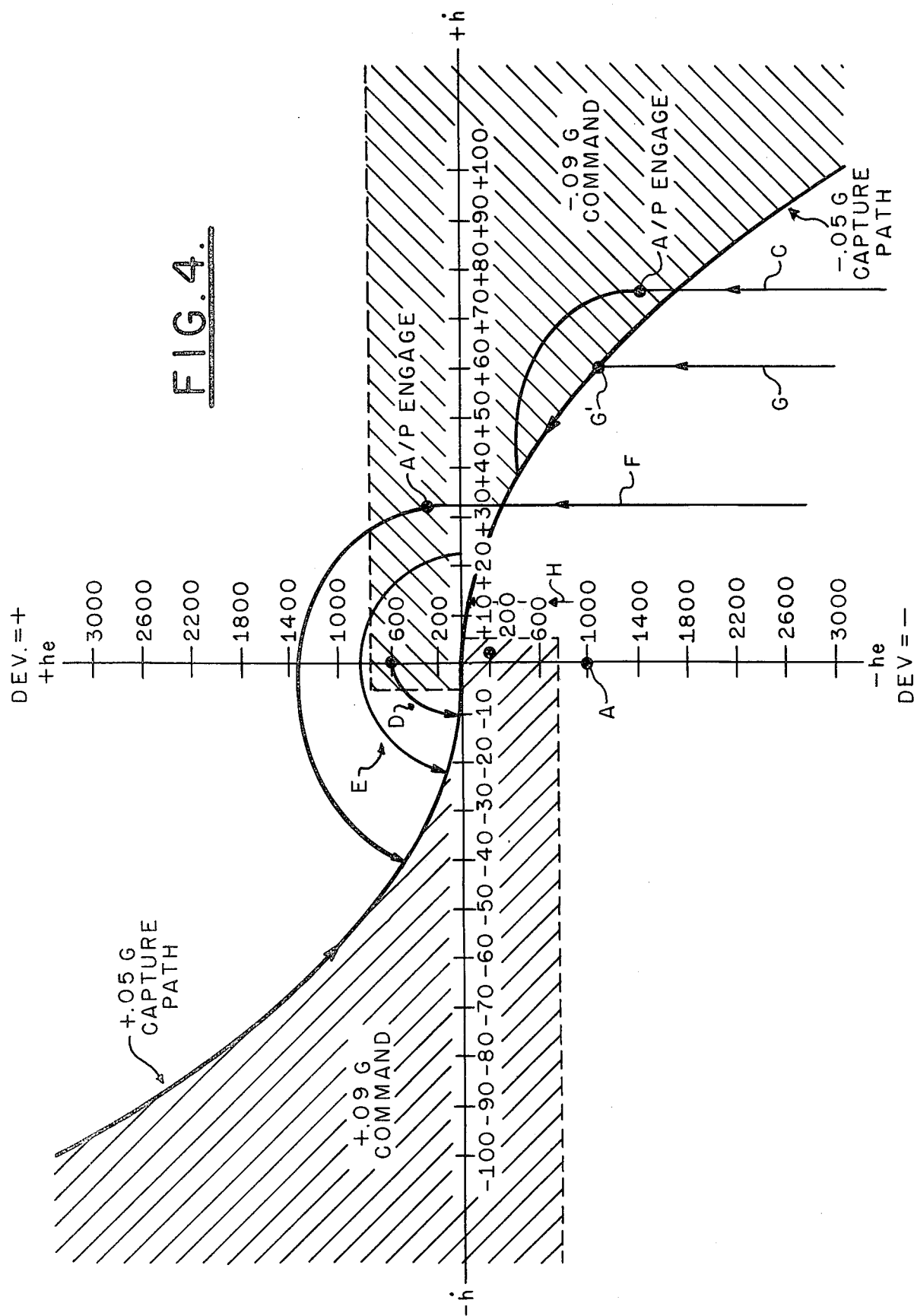

ALTITUDE CAPTURE MODE FOR AIRCRAFT AUTOMATIC FLIGHT CONTROL SYSTEM

BACKGROUND OF THE INVENTION

1. Field of the Invention

This invention relates generally to automatic flight control systems for aircraft and more particularly to autopilot apparatus for automatically capturing a preselected altitude under various automatic control engage conditions including abnormal conditions.

2. Description of the Prior Art

Automatic flight control systems for aircraft have for many years included the capability of causing the aircraft to automatically capture a predetermined altitude or an altitude that is preselected by the human pilot. These systems have performed with various degrees of success but were highly dependent upon performance limitations dictated by predetermined initial engage conditions, maneuver limits, passenger comfort, time of initiation of the automatic capture mode and so forth. In other words, the prior systems performed adequately only if all narrowly constrained engage prerequisites were met. For example, typical prior art automatic altitude capture systems attempted to precisely control the aircraft to a predetermined flight path in accordance with a predetermined control law in a continuous closed-loop fashion. Therefore, if for some operational reason, the aircraft was outside predetermined capture limits imposed by the control law, sometimes referred to as the capture window, automatic capture was impossible or if possible was accomplished in an extended oscillating manner and possibly exceeding desired g limits. For example, there may be instances wherein the pilot was operating the aircraft in a flight director mode and he desired to engage the automatic pilot during a capture maneuver. If this engagement took place under conditions wherein a substantial flight director error existed such that the aircraft was outside the automatic capture limits, a successful, smooth automatic capture within predetermined g limits could not be accomplished.

One such typical prior art automatic altitude capture apparatus is disclosed in the present assignee's U.S. Pat. No. 3,240,446 to H. Miller. With this apparatus, a smooth asymptotic autopilot engaged capture assumes autopilot engagement at altitude selection and that all initial conditions are fully satisfied. Another typical prior art automatic altitude capture apparatus is disclosed in the present assignee's U.S. Pat. No. 4,114,842 to Hofferber et al. This apparatus is an improvement over Miller in that it provides for a g-limited capture even though the pilot, occupied with other cockpit duties, inadvertently fails to arm the capture mode within the capture engage window. This is referred to a late capture engage and is accomplished by adjusting, within a predetermined g restraint, the window limits in accordance with existing aircraft position and rate conditions.

SUMMARY OF THE INVENTION

The present invention provides improved normal automatic pilot altitude capture and greatly extended flexibility in abnormal automatic pilot engagement in the altitude hold capture and preselected altitude capture modes of operation without exceeding predetermined g restraints and without substantial overshoot or oscillation. In a normal automatic pilot altitude capture, the altitude capture control law $$\left[\left(h_e + \frac{(\dot{h})^2}{2 \times .05 \times 32.2}\right) = 1.61\left(h_e + \frac{(\dot{h})^2}{2}\right)\right]$$

defines a circular flight path intercepting the selected altitude which is independent of true airspeed. This circular flight path will produce a 0.05 g normal acceleration force on the aircraft and of course the passengers, which is low enough to be unnoticeable. In order to anticipate and precisely control this circular flight path a predictive pitch command signal $\theta_p$ is provided so that a significant control law error need not be produced in order to command the required pitch change. This $\theta_p$ signal is a function of true airspeed and approximates the pitch rate needed to produce a 0.05 g maneuver. In other words, the predictive pitch command aids in keeping the control law satisfied. Since the control law requires the aircraft to intercept and maintain the selected altitude, the aircraft flight path angle $\gamma$ should be zero at the end of the capture maneuver. Accordingly, the predictive pitch term really calls for a changing flight path angle, which starts from an initial value and is integrated to zero. Thus, the control law signal and the predictive pitch signal will both be reduced to zero substantially simultaneously assuring a smooth, dead-beat capture of the selected altitude.

Now there may be operational reasons, discussed above, where the aircraft has not reached or has passed the normal capture flight path at the time the automatic pilot is engaged, or the pilot was using raw flight data, or the preselected altitude is less than or was engaged at less than a predetermined altitude error, e.g. 750 feet, or the like. For example, the aircraft may be on the low side or high side of the control law flight path, or the aircraft may have even passed through the selected altitude before autopilot engagement. The present invention provides means whereby the capture of the selected altitude may still be smoothly accomplished in a predictable manner and without an excessive g maneuver. Thus, the control law parameters are continuously monitored by the autopilot, responsive to an abnormal servosystem engagement, to establish a modified predictive pitch command which is used by itself to control the autopilot in an open loop fashion until the normal control law capture path is intercepted. The modified predictive pitch is an increased predetermined g command, for example a 0.09 g or 0.10 g command that is, an open loop command signal which produces a circular flight path which will result in a 0.09 g or 0.10 g pitch maneuver. When this open loop high-g flight path becomes tangent with the normal 0.05 g curve defined by the control law, the closed loop control law control function is established and the predictive pitch command is reduced to its normal 0.05 g value so that the normal automatic capture of the selected altitude is achieved.

BRIEF DESCRIPTION OF THE DRAWINGS

One preferred embodiment of the present invention is illustrated in the accompanying drawings wherein:

FIG. 1 which includes

FIG. 2 is a logic diagram for establishing high g and low g predictive pitch commands;

FIG. 4 is an altitude versus altitude rate or a phase-plane diagram of the normal and abnormal capture flight paths.

DESCRIPTION OF THE PREFERRED EMBODIMENT

Figure 1A:
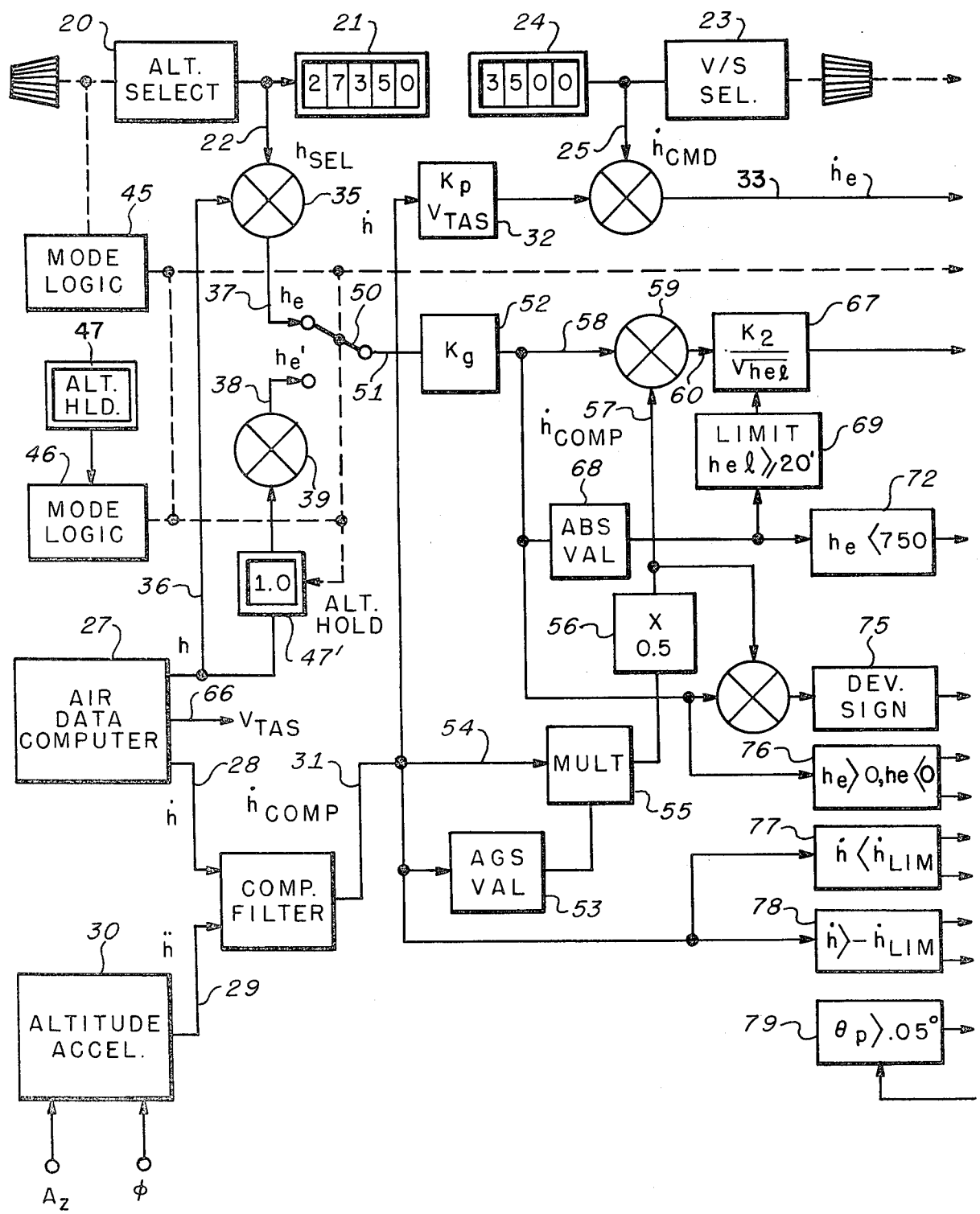
FIGS. 1a and 1b is an overall schematic diagram of the altitude capture apparatus of the invention.

In the following description of the invention, the involved apparatus and operation in normal autopilot engaged modes will first be discussed and then the involved apparatus and operation in various typical abnormal autopilot engage modes will be discussed.

The altitude of an airplane is of course controlled primarily by controlling its pitch control surfaces or elevators 10 and the autopilot controls the elevators through conventional servosystem 11, including conventional surface actuator, servo amplifiers, surface displacement and rate inner loop feedbacks, etc. The servo actuator is engageable with the control surface through an engagement means, such as by electro-hydraulic electric clutch 11', manually engageable by means of a pilot operated engage paddle or switch 5 and associated autopilot engage logic 6. Pitch altitude and attitude rate stabilization is provided by conventional gyroscope displacement and rate references 12 and 13 respectively. Thus, the pitch attitude reference automatically stabilizes the aircraft at whatever pitch attitude called for by the command input from summing circuit 14 while the pitch rate reference provides a pitch attitude damping function, all in a conventional fashion. Whenever the autopilot servos are disengaged or whenever the pitch steering or pitch guidance command output of summing junction 14 calls for a long term change in aircraft pitch attitude or whenever long term pitch trim changes are required, the attitude reference is synchronized by conventional attitude synchronizer 15, again in a conventional fashion familiar to those skilled in the aircraft autopilot art.

Conventional autopilots include a pilot's control panel by means of which the pilot and/or copilot may insert guidance or navigation commands to be carried out by the automatic pilot system through suitable mode select switches and mode annunciators and guidance parameter select knobs and corresponding value readouts. The servo engage paddles are also usually located on this panel. The present invention relates to the altitude preselect and altitude capture modes of operation and associated vertical speed mode of operation and these control panel mode select switches, parameter selectors and readouts have been illustrated in FIG. 1. These elements, being conventional in themselves and familiar to those skilled in this art, have been illustrated schematically in the interest of brevity. Briefly, one of these means is provided for selecting and displaying a desired altitude comprising pilot operated selector knob and electric signal producing means 20 and digital display readout 21 for providing on lead 22 a signal corresponding to altitude to which the autopilot is to maneuver the aircraft. This apparatus may be a fine and coarse selector of the type disclosed in the present Assignee's U.S. Pat., Nos. 4,331,039 issued May 25, 1982, and 4,334,222 issued June 8, 1982. Another of these means is provided for selecting and displaying a commanded vertical speed comprising pilot operator selector knob and electric signal producing means 23 and digital display readout 24 for providing on lead 25 a signal corresponding to the vertical speed or rate of climb (or dive) to which the autopilot is to maneuver the aircraft to the selected altitude. The vertical speed control signal is generated conventionally: a signal corresponding to the actual altitude rate $\dot{h}$ is provided from a conventional air data computer 27 on lead 28 which is complementary filtered with an attitude compensated aircraft vertical acceleration signal $\ddot{h}$ on lead 29 from a vertical acceleration source 30, such as an accelerometer to provide a wide frequency band complemented altitude rate signal $\dot{h}_{comp}$ on lead 31 in a conventional manner. This signal is gain controlled as a function of true airspeed $V_{TAS}$ at 32 and summed with the altitude rate command signal $\dot{h}_{CMD}$ on lead 25 to generate an altitude rate of vertical speed error signal $\dot{h}_e$ on lead 33. The altitude select and altitude hold control signals are similarly conventionally generated: the altitude select signal on lead 22 is compared at junction 35 with an actual altitude signal h on lead 36 from air data computer 27 to provide an error signal $h_e$ on lead 37 while the altitude hold error signal $h_e'$ on lead 38 similarly derived from junction 39.

In normal autopilot operation, the aircraft can be steered toward the selected altitude by any of a number of modes. One such mode is through selection of the vertical speed mode. Conventional mode select logic means are provided for initiating these altitude maneuvers. For example, after the desired altitude and altitude rate have been selected by the pilot, the maneuver may be initiated by pressing a vertical speed select push button 40 which in turn controls conventional mode logic 41 for inserting the commanded vertical speed $h_e$ signal on lead 32 to the summing junction 14 through operation of switch 42 and conventional displacement and integral channels 43 and 44, respectively. The resultant output of junction 14 is the pitch command signal $\theta_{CMD}$ which, through the autopilot servo system 11, commands a pitch attitude which will result in the commanded vertical speed of the aircraft. Other conventional logic is also involved, such as interlock logic 45 associated with altitude selector 20 for arming the vertical speed logic 41 and altitude hold logic 46 associated with altitude hold pushbutton 47, the latter permitting the pilot to manually cause the craft to hold the altitude obtaining when the button was actuated. In this connection, when the altitude hold mode is engaged, the altitude synchronizer 47' is frozen so that the output of junction 39 constitutes the altitude error $h_e'$.

Figure 3:
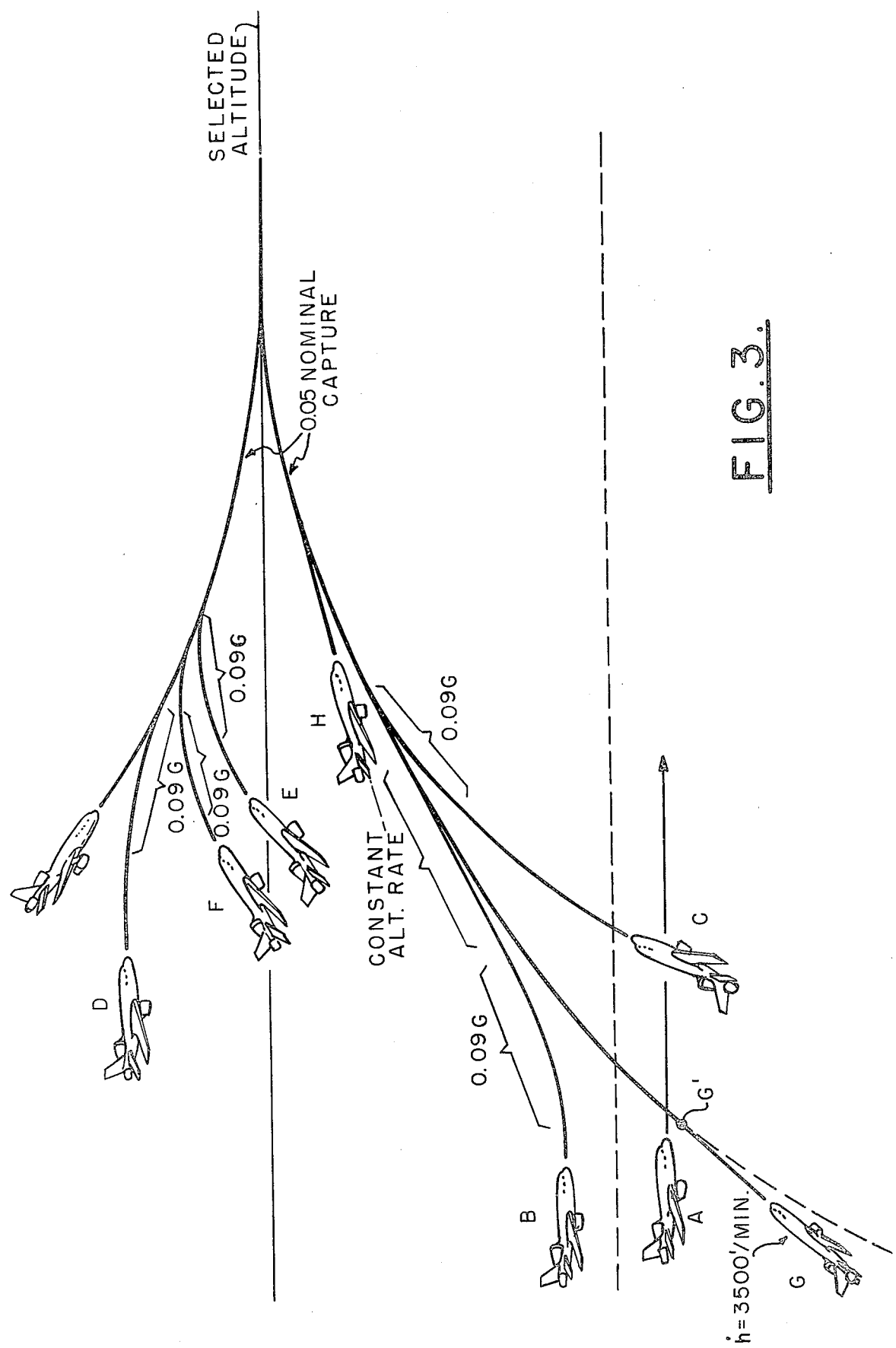
FIG. 3 is a diagram illustrating typical normal and abnormal altitude capture flight paths achieved by the control system.

Now assume that the aircraft is flying at, say, 18,000 feet and the pilot has selected a cruise altitude of 27,350 feet and that he has also selected a vertical speed of 3,500 feet per minute. Assume also that the pilot has actuated the V/S push button 40 actuating switch 42 to its upper position so that the autopilot is now stabilizing the pitch attitude of the aircraft required to maintain the selected vertical speed or rate of climb. In this circumstance, mode logic 45 actuates switch 50 to its upper position thereby connecting the altitude select error signal $h_e$ to the altitude capture apparatus. In accordance with the present invention, the altitude capture control law is expressed by the equation $$\theta_{CMD} = k_j h_e + \frac{\dot{h} \times |\dot{h}|}{2}$$

which under the normal capture conditions will result in a circular flight path which is automatically initiated at when the control law error goes to zero or substantially at zero and terminates with the selected altitude as a tangent, as illustrated by normal capture flight path g of FIG. 3. The value of the gain constant $k_g$ determines the normal acceleration force produced by the maneuver path which is essentially a circular path whose radius is a function of true airspeed. For example, for $k_g=1.61$, a 0.05 g maneuver will result. Airspeed changes during the maneuver will change the radius of the circle but the aircraft still follows a 0.05 g path. Thus, the altitude error signal on lead 51 is gain adjusted at 51 in accordance with the g-determining constant $k_g$ having, in the present example, a value of 1.61 to thereby provide the first term of the basic control law. The second term of the control law is derived from the complemented altitude rate signal $\dot{h}_{COMP}$ on lead 31. The absolute value thereof $|\dot{h}_{COMP}|$, is determined by means of absolute value detector 53, the output of which is multiplied by the altitude rate signal $\dot{h}_{COMP}$ on lead 54 by multiplier 55. Absolute value detector 53 assures the proper sign or polarity of the second control law term. The output of multiplier 55 is halved by gain adjust means 56 having a gain constant of 0.5 to provide on lead 57 the required control law term $\dot{h}^2/2$. This properly signed term is added to the first term $k_g h_e$ on lead 58 at summing point 59 to provide on lead 60 a signal proportional to the basic circular capture control law, $k_g h_e + \frac{1}{2}\dot{h}^2$.

In order to precisely control the actual aircraft flight path to that defined by the control law in a fully automatic closed loop manner under existing flight conditions by operation of the servo system 11, certain gain adjustments are made to the basic control law signal to assure optimum response and stability of the overall autopilot/aircraft servo loop. For example, in order to compensate for the change in loop gain produced by changes in surface effectiveness due to airspeed changes, the control law signal is gain programmed as an inverse function of true airspeed by gain adjustment means 65 which is responsive to a true airspeed signal 66 from a conventional air data computer, which signal may of course be supplied by the air data computer 27. Similarly, the control law signal is gain controlled as an inverse function, for example, an inverse square root function, of the change in the value of the altitude error $h_e$ below a limited value thereof in order to assure a substantially constant control loop sensitivity to any altitude rate error. This is accomplished by gain control means 67 which is inversely controlled by a signal proportional to the absolute value of $h_e$ from absolute value detector 68 below or equal to a predetermined value, say 20 feet, by means of limiter 69.

Figure 1B:
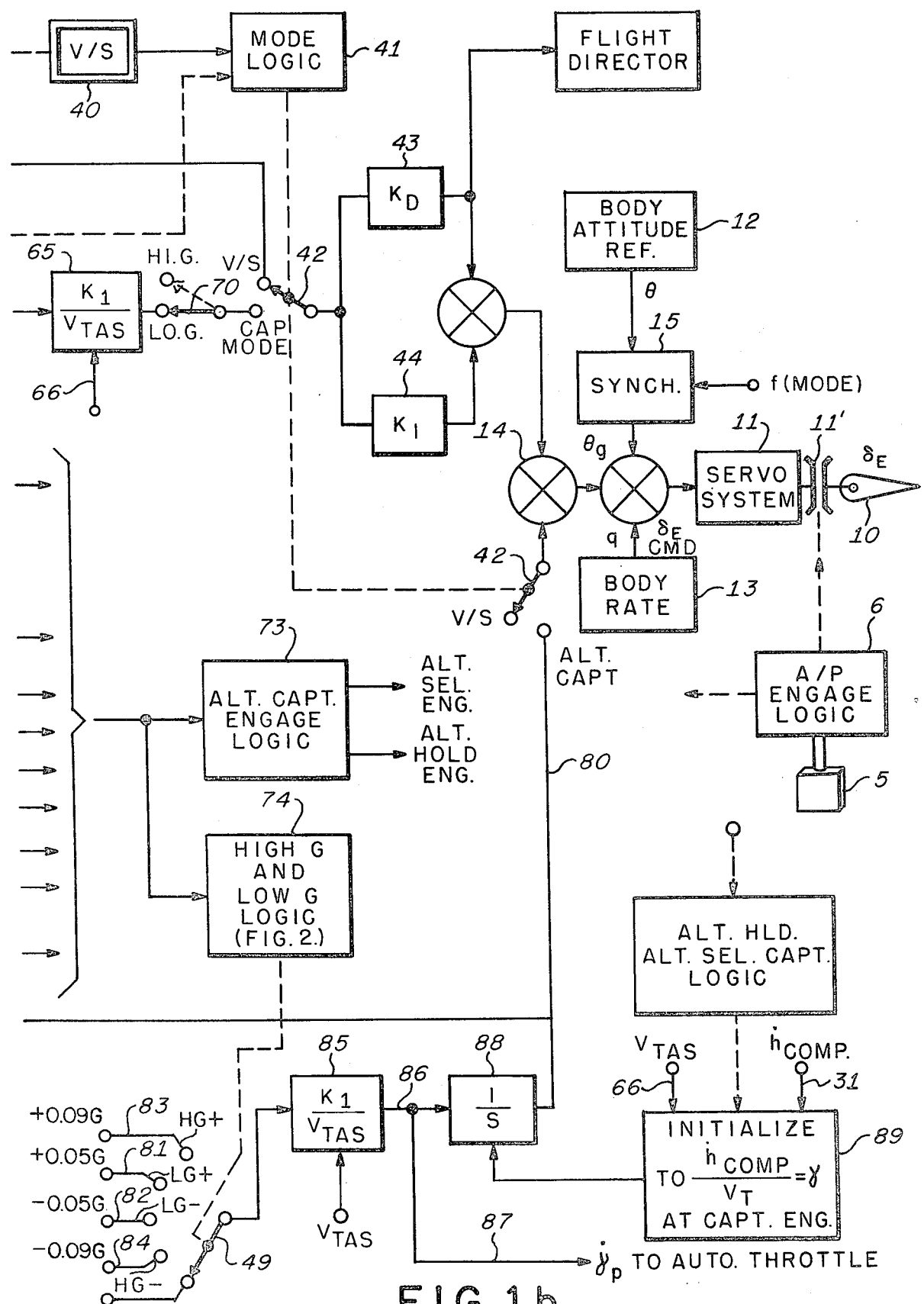

Recall now that the aircraft is approaching the selected altitude at the commanded vertical speed. It is desired to initiate the capture mode when the aircraft linear flight path intercepts the above defined circular flight path in space. Also, since the capture point is not yet reached, the switch 42 is still in its vertical speed position isolating the circular control law signal from the autopilot servo system 11, and a switch 70 is engaged in its low g position, both as shown in FIG. 1. However, the altitude select mode logic has coupled the altitude error signal to the circular control law signal path through switch 50 so that the control law parameters are being continuously monitored. This monitoring is performed by a plurality of parameter status detectors 75 through 79 which control the capture mode switching logic 73 and 74 to be described below. The detector 72 provides a logic signal when the absolute value of the altitude error $h_e$ is less than a predetermined value, say 750 feet. The detector 75 looks at the control law solution itself and provides a logic signal of one polarity or the other to indicate the polarity of the maneuver required to intercept the low g circular flight path. Detector 76 provides a logic signal of one polarity or other whenever the altitude error is greater than or less than zero. Detectors 77 and 78 look at the altitude rate signal $\dot{h}_{COMP}$ and provide logic signals when its value is less than a predetermined positive limited value or greater than a predetermined negative limited value, say-+and−2000 ft/min from 0−35,000 feet and 500 ft/min above 35,000 feet. The last detector 79 looks at the predictive pitch signal $\theta_p$, to be described below, and provides a logic signal when its value is above some very low or substantially zero value. The function of these logic signals will be discussed in more detail in the discussion of FIG. 2 below.

In order to minimize the control law error in initiating the circular capture path and more significantly to reduce any circular path standoff which would otherwise require significant integral path 44 output to compensate and in order to assure an optimum altitude capture under other than normal capture conditions, an anticipatory or predictive term is supplied directly to the autopilot servosystem 11 through summing junction 14 and switch 42; this anticipatory term being the predictive pitch command $\theta_p$ on lead 80. This predictive pitch term is completely independent of the basic control law computation and is derived from a plurality of fixed or reference d.c. signals having positive or negative polarities depending upon whether the aircraft is to push over or pull up and having amplitudes such as, upon suitable modifications, to command a plurality of circular flight paths which result in predetermined g force maneuvers. For example, as illustrated in FIG. 1, two sets of such bias or reference voltages are provided, one set 81 and 82 result in positive or negative low g maneuvers and the other set 83, 84 result in positive or negative high g maneuvers. These fixed voltages are selected by switch means, illustrated schematically at 49, controlled by the logic illustrated in FIG. 2. In accordance with the present invention the low g maneuver bias, producing for example a 0.05 g maneuver, is used for normal altitude captures and corresponds to that defined by the control law while the high g maneuver bias, producing for example a 0.09 g or 0.1 g maneuver, is used for abnormal altitude captures as determined by the operation of the capture logic 73 and 74. The predictive pitch biases 81–84 are fixed, d.c. voltage signals and constitute signals representative of predetermined g maneuver commands. These voltages are applied to a predictive pitch signal generator comprising gain controller 85 and integrator 88. Gain controller 85 modifies the bias signals as a function of true airspeed, effectively converting them to a predictive flight path angle rate command $\dot{\gamma}_p$ on lead 86. The predictive flight path angle rate signal $\dot{\gamma}_p$ may be supplied via lead 87 to the aircraft's autothrottle system as a throttle anticipation term to advance or retard the throttles to compensate for the commanded pitch change. Also, since the predictive command is essentially a flight path angle rate command, it is integrated in integrator 88 so that the predictive control signal $\theta_p$ on lead 80 is a flight path angle displacement command changing at a rate determined by the time constant of the integrator. The time constant of the integrator 88 is set to a value predetermined in accordance with the control law such that its integration rate corresponds to the aircraft pitch rate commanded by the control law. In order for the predictive flight path angle rate command from integrator 88 to reduce to zero simultaneously, or substantially simultaneously, with the command produced by the control law, whereby the aircraft flight path angle is zero when the craft has achieved the selected altitude, the integrator 88 is initiated by a signal corresponding with the existing aircraft flight path angle. This is accomplished by computing its value in computer 89, from available signals corresponding to true airspeed $V_{TAS}$ and altitude rate $\dot{h}_{COMP}$ on leads 66 and 31 respectively, using the well known relationship, $$\gamma = \frac{\dot{h}_{COMP}}{V_{TAS}}$$

for normal small values of $\gamma$. The integrator initialization is performed upon initiation of the altitude select capture or altitude hold capture by conventional logic circuits 73 which are satisfied by the logic equation provided in FIG. 2.

Again recall that the aircraft is still approaching the selected altitude at the selected vertical speed with the autopilot engaged through autopilot engage paddle 5 and engage logic 6, that is, at a corresponding flight path angle, under normal approach conditions. This approach is represented by path g of FIGS. 3 and 4. Assume also that the craft has not yet intersected the altitude capture transition path defined by the control law. Under these conditions the status of the detectors 75–78 are such that the altitude capture engage logic 73 relationship set forth in FIG. 2 is not satisfied and therefore the altitude select engage logic signal and altitude capture logic signal on leads 95 and 96 are low or zero and therefore the switches 41 and 42 remain in the positions shown in FIG. 1. When the craft reaches and just passes point g', of FIGS. 3 and 4, the control law signal reduces to zero and changes sign and DEV detector 75 output goes positive (assuming an approach from below the selected altitude). At this instant the DEV logic signal on lead 97 goes high and change detector 98 goes high providing a high at the input of AND gate 99. Since the DEV logic has changed state (to high) and the value of $h_e$ is less than zero, the altitude select engage logic of FIG. 2 is simultaneously satisfied and a high appears on lead 95 (the parenthesized terms of the logic relationship are not applicable in this normal capture operation) thereby providing a second high at gate 99 and a consequent output thereof on lead 100, this high logic signal being latched through OR gate 102. The output of OR gate 103 responsive to the high altitude engage logic signal on lead 95 is used to activate mode logic 41 to switch the system to the altitude capture mode through switches 42. These switches connect the output of switch 70 and the predictive pitch signal $\theta_p$ to the autopilot servo system and simultaneously initializes the $\theta_p$ signal generators 85, 88 through initialization circuit 89. The high signal on lead 100, labeled low gain level, serves a number of logic functions: it closes switch 70 to switch any control law error signal to the servo system; it operates latch 104 to supply a low (or high) on its output lead depending on whether the approach is from below or above the selected altitude and thereby determines the polarity of the low gain, or 0.05 g predictive pitch signal through the non-inverting and inverting inputs to AND gates 105 and 106 respectively, and it also controls the high gain predictive pitch AND gates 107 and 108 to be further described below. Since the aircraft has just intercepted the normal 0.05 g circular flight path, the value of the predictive pitch term (flight path angle) is greater than 0.05° and a high is applied to gates 105 and 106. Also since the approach is from below the selected altitude, the logic signal output from latch is a logical zero. Thus, the AND gate 106 is satisfied and its output is used to connect through switch 49 the −0.05 g or negative low gain bias signal 82 to the above described predictive pitch signal generating means 85, 88 and the resultant predictive pitch signal $\theta_p$ on lead 80 to the autopilot servo. Thus, as described above, the $\theta_p$ open loop control term drives the elevators through autopilot servo system 11 to control the aircraft to reduce the flight path angle at a constant rate and hence an approximate 0.05 g circular path in space defined by the 0.05 g bias. Should turbulence or other disturbances exist, the closed loop 0.05 g circular maneuver defined by the control law computation, through the conventional displacement and integral paths 43, 44 of autopilot pitch channel, will tend to maintain the craft on the desired circular flight path until the selected altitude is captured. When the value of the predictive term $\theta_p$ reduces to a very low value, say 0.05°, the corresponding logic signal to gates 105, 106 goes to zero thereby switching out the predictive pitch bias through switch 49. Since a normal approach from above the selected altitude is the same except for signal sign change, its operation will not be described.

According to the teachings of the present invention, a smooth automatic capture of the selected altitude may be accomplished under unusual or non-normal capture initiation conditions: for example, where the pilot is operating the aircraft in the flight director mode and has permitted a large error to accumulate, or when he was flying manually on raw data, and initiates an autopilot altitude capture by engaging the autopilot at a point from which a normal capture may not be accomplished. A number of these are illustrated by the flight paths illustrated in FIGS. 3 and 4. Note that the coordinates of the curves of FIG. 4 are altitude rate vs altitude and the curves define a locus of normal control law capture points. In engaging the autopilot at conditions B through F, the aircraft is caused to follow a higher than normal g circular flight path, for example a 0.09 g flight path. As will be explained below, this flight path is provided by an open-loop 0.09 g command signal supplied to the servosystem 11, that is, it is independent of the closed-loop circular flight path command defined by the control law and normally supplied to the servosystem 11. Note that if the autopilot is engaged at position A no capture will be commanded since the altitude error is greater than 750 feet and the engage logic equation of FIG. 2 and conventionally solved by logic 73 is not satisfied.

Referring now to flight path C where the pilot engages the autopilot through paddle switch 5 and engage logic 6 after the normal automatic capture point has been passed. When the craft intercepted the control law circular capture flight path, the DEV logic signal reversed sign providing a high at the input of AND gate 99. However, since the autopilot was not engaged at that time, the altitude select engage logic signal on lead 95 remains zero so that the low gain level logic on lead 100 is low and the capture mode logic 41, 46 is not satisfied whereby the switches 42 will remain in their vertical speed positions. Likewise the low gain switch 70 will remain closed.

Referring to high gain logic gates 107 and 108, the logic inputs $\dot{h} < \pm \dot{h}_{LIM}$ should be explained. First the $\dot{h}_{LIM}$ is not the 5 ft/min limit expressed in the engage logic relationship; these will be explained below. The $\dot{h}_{LIM}$ are maximum performance limits and represent predetermined high altitude rates, for example 2000 ft per minute from sea level to 35,000 ft and 500 ft per minute above 35,000 ft which if exceeded, would result in objectionably high pitch attitudes. Therefore, if these altitude rate limits are exceeded the high gain logics are inhibited and the craft will proceed toward the selected altitude at the limited rate until one of the other capture engage mode conditions are satisfied. This flight path is illustrated by path B of FIG. 3.

When DEV signal changed sign, e.g. from minus to plus, the DEV logic output of detector 75 went high. Consequently, a high is applied to negative high gain AND gate 108 and a corresponding low to positive high gain AND gate 107. Since low gain level logic signal on lead 100 is low and assuming the $\pm \dot{h}_{LIM}$ performance limits are not exceeded, the negative high gain logic 108 is satisfied and the positive high gain gate 107 is not satisfied and therefore the output of gate 108 operates predictive pitch switch 49 to its negative 0.09 g bias terminal 84. However, since the autopilot is not engaged, the altitude capture logic 41 is not satisfied and the integrator 88 is not initialized and switches 42 not closed to their altitude capture positions.

Now assume the pilot engages the autopilot at the point indicated in FIG. 4. Since the altitude capture engage equation is satisfied, a high appears on lead 95 and altitude select logic 41 closes switches 42 to their capture positions and initializes integrator 88 which provides on lead 80 the 0.09 g predictive pitch command signal to the autopilot servo 11. Note that when the autopilot is engaged, there is no change detected by the change detector 110 responsive to the DEV logic signal and the low gain level logic signal remains low. Since this logic signal remains low, switch 70 remains open and the only signal to the servosystems is the predictive pitch signal $\theta_p$ which provides an open loop pitch command to cause the craft to perform a 0.09 g circular path maneuver. As illustrated in FIG. 4, this path continues until the craft intercepts the normal 0.05 g capture path. Such intercept is detected by the solution of the control law changing sign and the DEV logic output likewise changing sign, i.e., from plus to minus. This causes the output of gate 99 and the signal on low gain lead 100 to go high and inhibit the output of the negative high gain gate 108 and provides a high output from negative low gain gate 106 to thereby substitute the 0.05 g predictive pitch reference signal for the 0.09 g reference signal to the predictive pitch signal processor 85, 88. It will also be noted that in accordance with this invention the high from gate 106 closes switch 70, modifying the open-loop predictive pitch command to the servo system 11 by the closed loop control law command thereby assuring dead beat capture of the selected altitude.

Another typical non-normal altitude capture situation is illustrated by flight paths F of FIGS. 3 and 4 (the scales obviously may not be exact but are illustrative); that is, initiation of an autopilot capture of the selected altitude after the craft has passed through that altitude.

As before, the DEV logic 75 has already changed polarity and therefore the negative high gain logic 108 connects the switch 49 to the negative 0.09 g predictive pitch reference voltage. Also, as above, when the autopilot is engaged, the initialized predictive pitch signal is applied to the servo system 11 through closure of switches 42 to cause the craft (switch 70 remaining open) to perform an open loop 0.09 g pushover maneuver. Eventually the aircraft will approach, from above the reference altitude, and thereafter intercept the corresponding pull-up circular approach path defined by the control law. When this occurs the DEV logic again changes state or sign as detected by the change detector 110 supplying a high to gate 99 (already set by the high from gate 103) to supply a high or low gain level lead 100. Note that the altitude error h3 is positive so that the latch 104 now supplies a high output. Thus the gate 105 supplies an output to switch 49 to connect the positive 0.05 g reference bias to the predictive pitch signal $\theta_p$ generator 85, 88 etc. and through closure of switch 70 the craft executes a normal from above capture of the reference altitude.

A further non-normal autopilot engage capture initiate is illustrated in FIGS. 3 and 4 as depicted by curve H. In this case the aircraft is approaching the selected altitude at a very low rate, for example 5 feet per minute or less. If the autopilot is engaged at any point within 750 feet of the selected altitude the altitude capture engage logic equation is not satisfied and the AND gate 99 cannot be satisfied, the predictive pitch term $\theta_p$ is inhibited and the craft will continue its approach under control of the previous closed loop control law until DEV changes sign. Then the normal capture is executed.

Another typical non-normal altitude capture is illustrated by path E of FIG. 3, assuming the aircraft is in a vertical speed mode or in a raw data referenced climb and the pilot selects the altitude hold mode. Since the reference altitude is that existing when altitude hold was selected, the open-loop high g predictive pitch term $\theta_p$ will be immediately commanded until the capture from above control law flight path is intercepted; the operation being substantially the same as described with respect to path F of FIGS. 3 and 4.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. Automatic pilot apparatus for controlling an aircraft to execute a maneuver to capture a predetermined altitude comprising:
   means for generating a control law signal representative of a circular flight path tangentially intercepting said predetermined altitude and resulting in a first predetermined normal acceleration force on said aircraft;
   means for generating a predictive pitch attitude signal based on a signal representative of said first predetermined normal acceleration force on said aircraft, and
   means for combining said control law signal and said predictive pitch signal to provide a pitch attitude command signal for controlling said aircraft to execute said altitude capture maneuver.

2. The apparatus as set forth in claim 1 wherein said control law signal generating means includes:
means responsive to the error ($h_e$) between the existing altitude of said aircraft and said predetermined altitude and the rate of change of altitude ($\dot{h}$), and
means for combining said signals in accordance with the expression $$k_1 h_e + \frac{(\dot{h})^2}{k_2}$$

where $k_1$ and $k_2$ are predetermined constants.

3. Apparatus as set forth in claim 1 or 2 wherein said predictive pitch signal generating means includes:
means for providing a reference signal representative of said first predetermined normal acceleration force, and
integrator means responsive to said reference signal for providing said predictive pitch signal.

4. The apparatus as set forth in claim 3 wherein said integrator means includes
means responsive to the existing flight path angle of said aircraft for initiating the operation of said integrator means.

5. Automatic pilot apparatus for aircraft including servomotor means for controlling the pitch attitude of said aircraft and means for manually engaging the same for automatically controlling the aircraft to initiate and thereafter execute a pitch maneuver to capture a predetermined altitude comprising:
means for generating a control law signal representative of a circular flight path tangentially intercepting said predetermined altitude and resulting in a first predetermined normal acceleration on said aircraft,
means for generating first and second predictive pitch attitude signals based on first and second signals respectively representative of said first predetermined normal acceleration force and a second and greater predetermined normal acceleration force, and
logic means responsive to engagement of said autopilot and to said control law signal obtaining a substantially zero value for supplying both said control law signal and said first predictive pitch signal to said servomotor means or for supplying only said second predictive pitch signal to said servomotor means.

6. The apparatus as set forth in claim 5 wherein said logic means is responsive to which of said engagement and said control law signal reducing substantially to zero first occurs for supplying both said control law signal and said first predictive pitch signal to said servomotor means or for supplying only said second predictive pitch signal to said servomotor means.

7. The apparatus as set forth in claim 6 wherein said logic means is responsive to the initial reduction of control law substantially to zero and a subsequent engagement of said servomotor means for supplying said second predictive pitch signal to said servomotor means and is thereafter responsive to a subsequent reduction of said control law signal substantially to zero for supplying said control law signal and said first predictive pitch signal to said servomotor means.

8. The apparatus as set forth in claim 7 wherein said logic means is further responsive to a predetermined low value of said first predictive pitch signal for inhibiting its supply to said servomotor means.

9. Flight path control apparatus for aircraft enabling said aircraft to execute a maneuver to capture a predetermined altitude comprising:
means for generating a control law signal representative of a circular flight path tangentially intercepting said predetermined altitude and resulting in a first predetermined normal acceleration force on said aircraft,
means for generating first and second predictive pitch attitude signals based on first and second signals respectively representative of said first predetermined normal acceleration force and a second and greater predetermined normal acceleration force,
flight director means responsive to said control law signal for enabling the pilot manually to execute said capture maneuver,
manually engageable autopilot servomotor means responsive to said control law signal and said predictive pitch attitude signals for enabling said servomotor means to automatically control the aircraft to execute said capture meaneuver, and
logic means responsive to engagement of said autopilot and to said control law signal obtaining a substantially zero value for supplying both said control law signal and said first predictive pitch signal to said servomotor means or for supplying only said second predictive pitch signal to said servomotor means.

10. The apparatus as set forth in claim 9 wherein said logic means is responsive to which of said engagement and said control law signal reducing substantially to zero first occurs for supplying both said control law signal and said first predictive pitch signal to said servomotor means or for supplying only said second predictive pitch signal to said servomotor means.

* * * * *